United States Patent
Cao et al.

(10) Patent No.: US 12,385,801 B2
(45) Date of Patent: Aug. 12, 2025

(54) BOUNDARY ADAPTIVE STRUCTURAL FATIGUE DAMAGE DETECTION METHOD DRIVEN BY TIME-DOMAIN INFORMATION ENTROPY

(71) Applicants: Jiangxi University of Science and Technology, Ganzhou (CN); Hohai University, Nanjing (CN); JSTI Group, Nanjing (CN)

(72) Inventors: Maosen Cao, Nanjing (CN); Tongfa Deng, Ganzhou (CN); Ruke Tan, Nanjing (CN); Chunhui Xie, Nanjing (CN); Yufeng Zhang, Nanjing (CN); Zha Ni, Nanjing (CN); Zeyu Wang, Nanjing (CN)

(73) Assignees: Jiangxi University of Science and Technology, Ganzhou (CN); Hohai University, Nanjing (CN); JSTI Group, Nanjing (CN)

( * ) Notice: Subject to any disclaimer, the term of this patent is extended or adjusted under 35 U.S.C. 154(b) by 122 days.

(21) Appl. No.: 18/134,058

(22) Filed: Apr. 13, 2023

(65) Prior Publication Data
US 2023/0358630 A1  Nov. 9, 2023

(30) Foreign Application Priority Data
Apr. 13, 2022 (CN) .......................... 202210385643.7

(51) Int. Cl.
G01M 5/00 (2006.01)

(52) U.S. Cl.
CPC .................. G01M 5/0033 (2013.01)

(58) Field of Classification Search
None
See application file for complete search history.

(56) References Cited

U.S. PATENT DOCUMENTS

| | | | |
|---|---|---|---|
| 2010/0036617 A1* | 2/2010 | Mathews | ............ G01N 29/069 702/34 |
| 2014/0156229 A1* | 6/2014 | Norato | .................... G06F 30/17 703/1 |
| 2019/0394283 A1* | 12/2019 | Morrison | ............ H04L 41/5009 |

* cited by examiner

Primary Examiner — Alvaro E Fortich
Assistant Examiner — Carl F. R. Tchatchouang

(57) ABSTRACT

A boundary adaptive structural fatigue damage detection method driven by time-domain information entropy comprises a sensor sequence composed of several sensors arranged on the structure, which is used to apply excitation to the structure, collect the displacement time-history response curves at different positions on the structure, and establish a database of time-history data. According to the data set in the database, the information entropy of the time-history response at different positions on the acquisition structure is obtained based on the information entropy to measure the disorder degree of the time-domain response signal. According to the location of several sensors, the information entropy values of the time-history response are connected in turn to obtain the time-history information entropy curve of the whole structure. Analyze of time-history information entropy curve, and the information entropy curve will show jump phenomena to determine the location of the crack.

1 Claim, 14 Drawing Sheets

BOUNDARY ADAPTIVE STRUCTURAL FATIGUE DAMAGE DETECTION METHOD DRIVEN BY TIME-DOMAIN INFORMATION ENTROPY

CROSS-REFERENCE TO THE RELATED APPLICATION

This application is based upon and claims priority to Chinese Patent Application No. 202210385643.7, filed on Apr. 13, 2022, the entire content of which is incorporated herein by reference.

TECHNICAL FIELD

The invention relates to the field of structural health monitoring technology, in particular to a boundary adaptive structural fatigue damage detection method driven by time-domain information entropy.

BACKGROUND

Since the new period of Reform and Opening-up, the total amount of bridge construction in China has been increasing, and the demand for bridge monitoring and maintenance has shown a rapid growth trend. To ensure the safety of bridge operation and maintenance, monitoring bridge conditions is essential. With the development of sensing technology, data transmission, storage, and processing technology, massive structural health detection data are extracted. These massive data contain rich information characterizing structural damage. The full utilization of massive monitoring data requires damage identification algorithms that can efficiently extract damage features from massive data. Although the overall evolution of the bridge structure state is long-term, the bridge structure contains many micro-fatigue crack damages during its service period. The fatigue cracks undergo an alternating load cycle, continue to expand forward, and finally radiate outward from the crack source point, resulting in component fracture. However, detecting low frequency is not time-sensitive, and it is difficult to observe the change process thoroughly and timely. It is necessary to use high-frequency and time-sensitive detection data to ensure the identification accuracy of the development trend of structural fatigue cracks. Due to the many uncertainties of the structural state, it is not easy to establish a more accurate mathematical model through a single theoretical hypothesis. The traditional theory-driven modeling method has been unable to meet the demand.

The data-driven analysis method can provide a solution for structural fatigue crack analysis due to its advantages of stability and strong adaptability to random disturbances. At present, the commonly used fatigue crack identification method is mainly based on the known system and its dynamic output signal. Using the response data collected by the monitoring sensor through the restoring force surface model method (RFS), the Volterra series high-order frequency response function method, the short-time Fourier transform (STFT), and other methods to identify the cracks. The research methods are as follows: the restoring force surface model method (RFS) takes the force related to velocity and displacement as the internal restoring force of the system and establishes a three-dimensional relationship between the restoring force, displacement, and velocity of the system to study the fatigue crack. The linear system is well identified, and the crack damage identification of the nonlinear system is lacking. The Volterra series high-order frequency response function method is used to study the damage identification and bilinear parameter estimation of nonlinear structural systems under harmonic excitation. The value of the parameter is related to the size of the crack and the degree of structural degradation. The parameter estimation is solved by recursive iteration. In the case of a small crack depth, the crack can be identified, but the method depends on the value of the parameter. The STFT method is proposed as a time-frequency analysis method of signals. The band-pass filters with different center frequencies are used to segment and extract the spectral components of the signals, and then the output envelope is squared to reflect the variation of the power of the frequency components in the frequency range of the signal with time to identify the crack damage. It cannot achieve high resolution in both frequency and time, which affects the accuracy of time-frequency analysis to a certain extent.

At present, there is a lack of a method that can analyze each sensor quickly and easily, extract the information of fatigue cracks and achieve the purpose of lightweight. This method extracts the information on fatigue cracks from the time-domain data and obtains the distribution curve of the time-domain information entropy of the structure through the position of the sensor and the time-history displacement curve obtained by it. According to the information entropy, the fatigue crack information is independent, and the sensitivity analysis of fatigue cracks at different depths and positions in the area where several fatigue cracks are located can be quickly judged by curve jump to avoid shortcomings that cannot be identified due to changes in boundary conditions. At the same time, it has good robustness and anti-noise ability.

SUMMARY

The invention provides a boundary adaptive structural fatigue damage detection method driven by time-domain information entropy, which can quickly judge the sensitivity analysis of fatigue cracks at different depths and positions in the area where several fatigue cracks are located and have good robustness and anti-noise ability.

The invention provides a boundary adaptive structural fatigue damage detection method driven by time-domain information entropy, which includes the following steps:

S1, a sensor sequence composed of several sensors is arranged on the structure, which is used to apply excitation to the structure, collect the displacement time-history response curves at different positions on the structure, and establish a database of time history data:

S2, according to the data set in the database, the information entropy of the time-history response at different positions on the acquisition structure is obtained based on the information entropy to measure the disorder degree of the time-domain response signal. According to the location of several sensors, the information entropy values of the time-history response are connected in turn to obtain the time-history information entropy curve of the whole structure.

S3, analyze of time-history information entropy curve; because the fatigue crack has 'repeated open and close' characteristics, the information entropy will highlight the amount of information when the fatigue crack opens, that is, the information entropy value will produce mutation, the information entropy curve will appear jump phenomenon, to determine the location of the crack.

The above excitations are the JI distribution excitation, the Gaussian distribution excitation, or the logarithmic distribution excitation.

The information entropy value of the above time-history response is:

$$H(X) = -\sum_{i=1}^{N} P(x_i)\log_2[P(x_i)]$$

where $x_0, x_1, x_2, x_3, \ldots, x_{N-1}$ represent the results obtained by the signal x of the probability $P(x_i)$ of the event i in the time record of all events, and $P(x_i)$ is the proportion of the structural displacement at the ith moment to the total displacement at the whole moment.

Compared with the existing technology, the beneficial effect of the invention is as follows:

Compared with the traditional method, which cannot identify the fatigue crack due to the change of the boundary conditions, the method of this invention overcomes the difficulty of the traditional method, which cannot extract the crack information in time effectively and has a worse anti-noise ability. The information on the fatigue crack is extracted from the time domain data, and the distribution curve of the time domain information entropy of the structure is obtained by the position of the sensor and the time-history displacement curve obtained by the sensor. According to the information entropy, the fatigue crack information is independent. Through the curve jump, the sensitivity analysis of the fatigue cracks at different depths and positions can be quickly judged in the area of several fatigue cracks, avoiding shortcomings that cannot be identified due to the change of boundary conditions. It also has good robustness and anti-noise ability.

DETAILED DESCRIPTION OF THE EMBODIMENTS

The following is a detailed description of a specific embodiment of the invention in combination with FIGS. 1-8, but it should be understood that this embodiment does not limit the protection range of the invention.

Figure 1A:
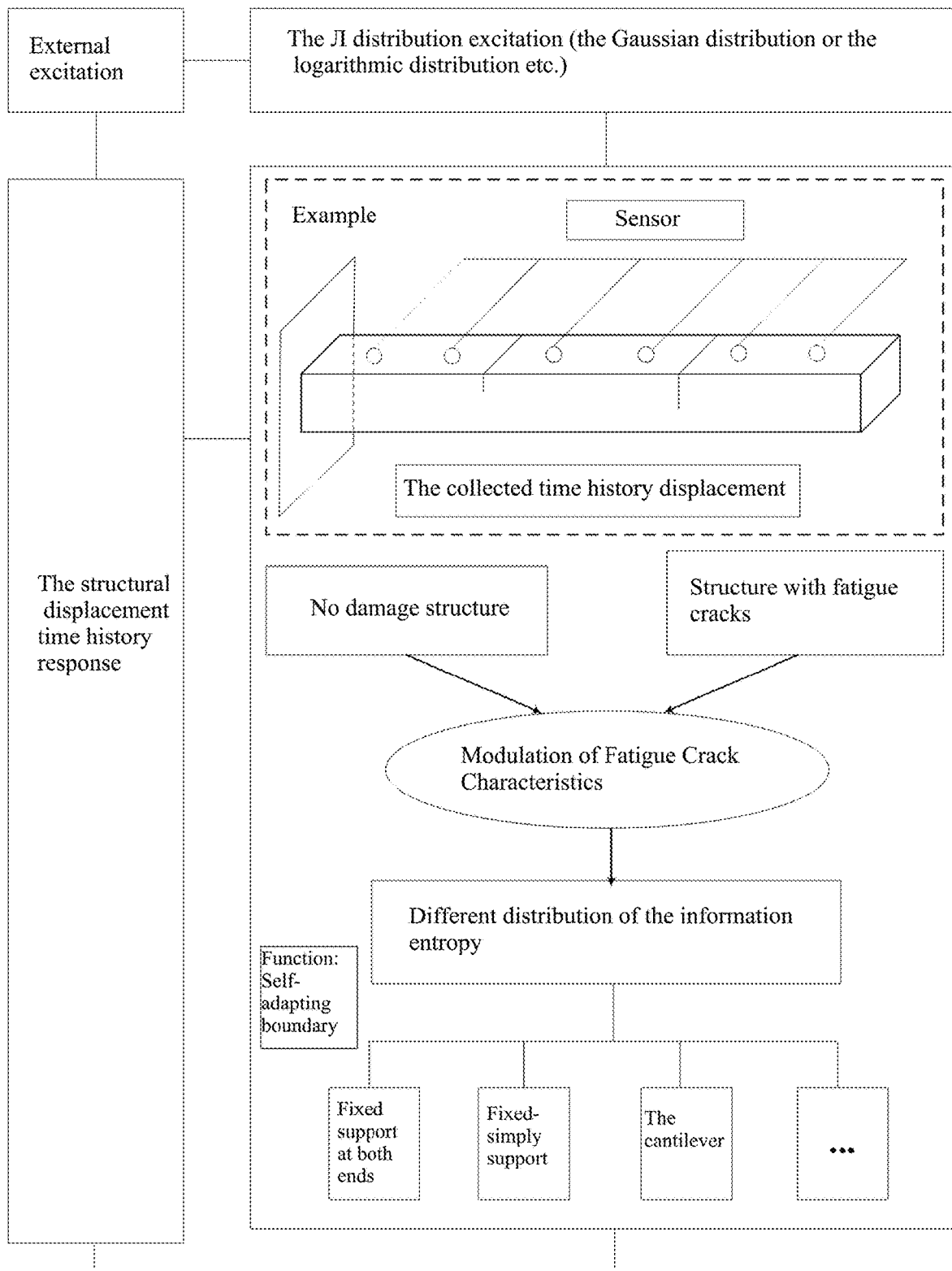
FIGS. 1A and 1B conjointly show the specific process diagram of the method in this invention.
Figure 1B:
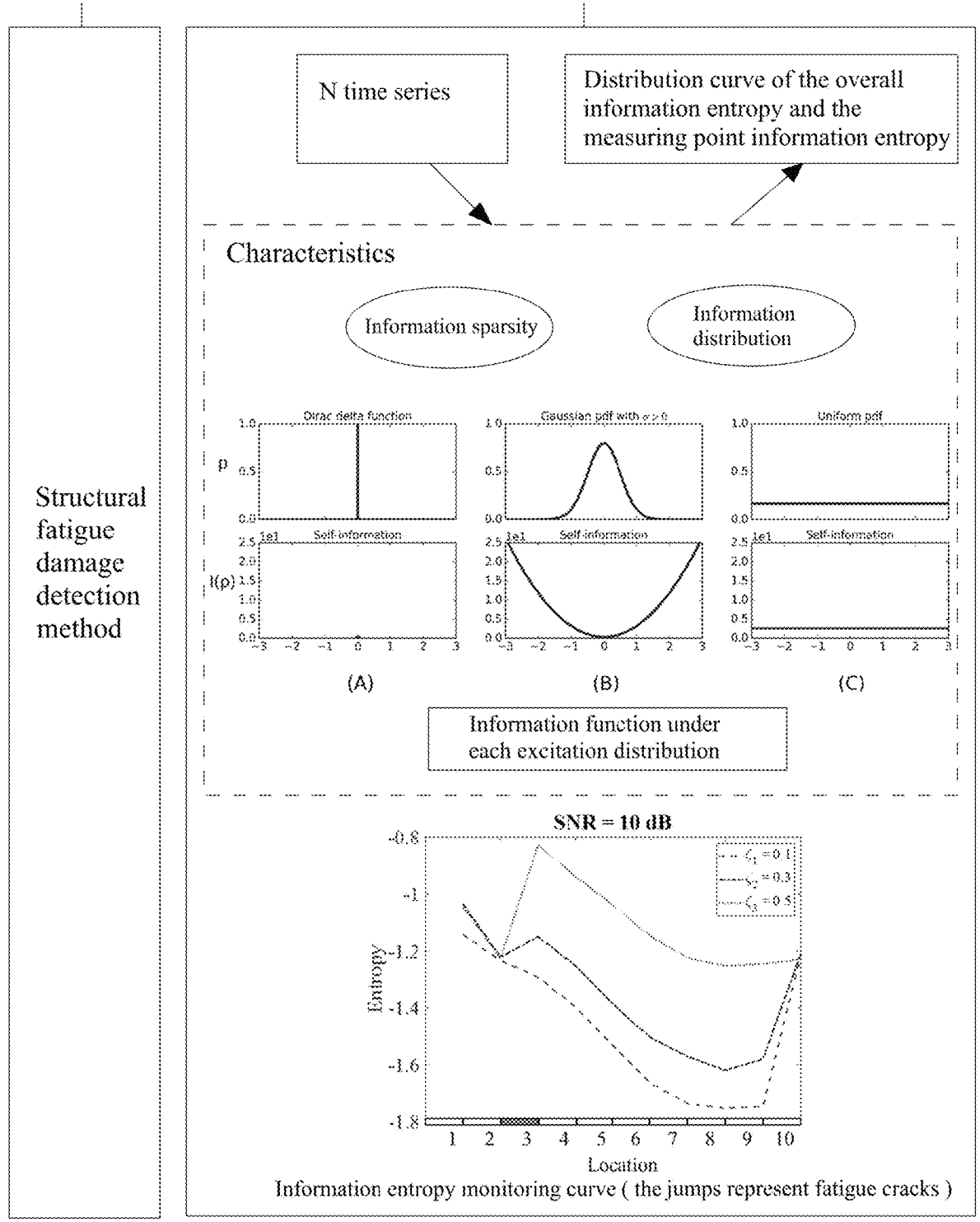

As shown in FIGS. 1A and 1B, the embodiment of the invention provides a boundary adaptive structural fatigue damage detection method driven by time-domain information entropy, which includes the following steps:

Step 1, a sensor sequence composed of several sensors is arranged on the structure, which is used to apply excitation to the structure, collect the displacement time-history response curves at different positions on the structure, and establish a database of time-history data;

Step 2, according to the data set in the database, the information entropy of the time-history response at different positions on the acquisition structure is obtained based on the information entropy to measure the disorder degree of the time-domain response signal. According to the location of several sensors, the information entropy values of the time-history response are connected in turn to obtain the time-history information entropy curve of the whole structure.

$$H(X) = -\sum_{i=1}^{N} P(x_i)\log_2[P(x_i)]$$

where $x_0, x_1, x_2, x_3, \ldots, x_{N-1}$ represent the results obtained by the signal x of the probability $P(x_i)$ of the event i in the time record of all events, and $P(x_i)$ is the proportion of the structural displacement at the ith moment to the total displacement at the whole moment.

Step 3, analyze of time-history information entropy curve; because the fatigue crack has 'repeated open and close' characteristics, the information entropy will highlight the amount of information when the fatigue crack opens, that is, the information entropy value will produce mutation, the information entropy curve will appear jump phenomenon, to determine the location of the crack.

The embodiment below is used for describing the specific implementation in detail.

Figure 2:
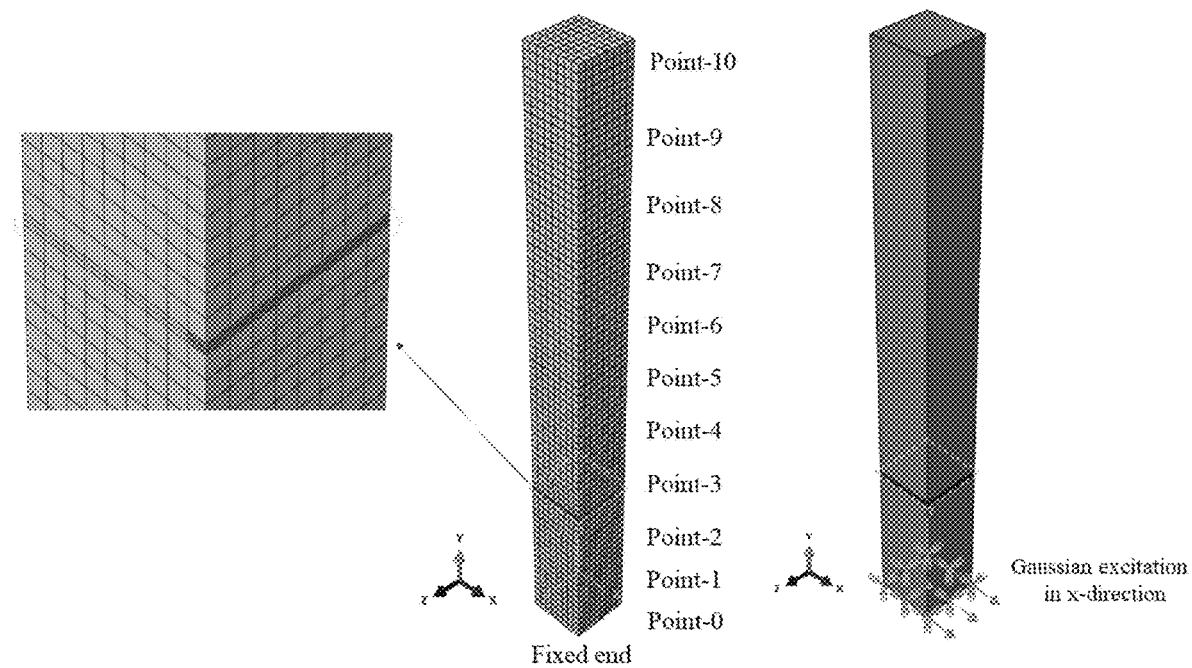
FIG. 2 is the modeling model of a beam crack in the invention.
Figure 3A:
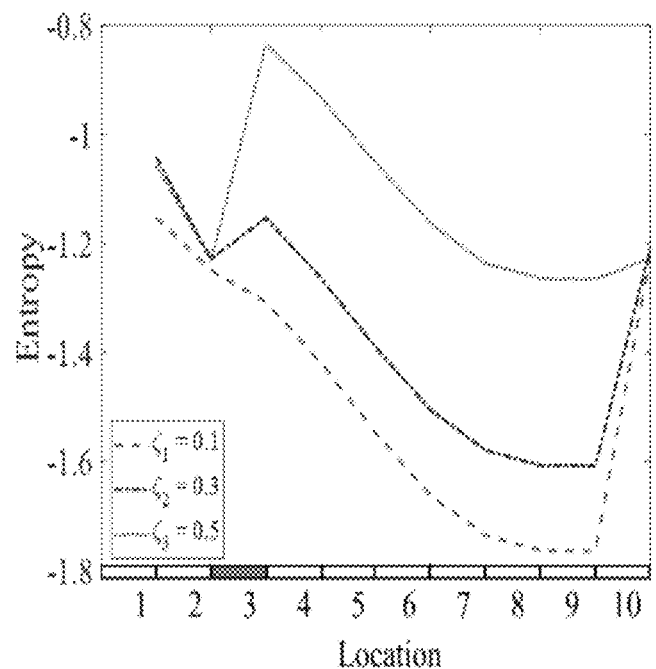
FIG. 3A-3C are the Shannon entropy curves at different positions in the case of the cantilever boundary of a single breathing crack in the invention.
Figure 3B:
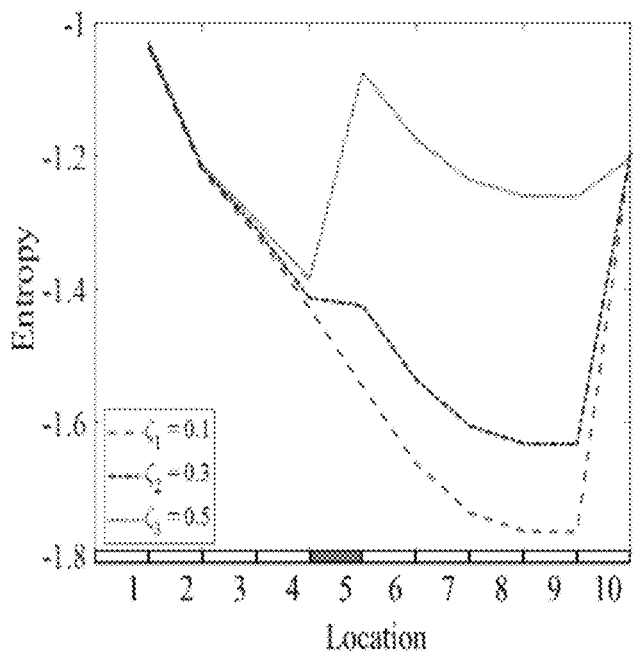
Figure 3C:
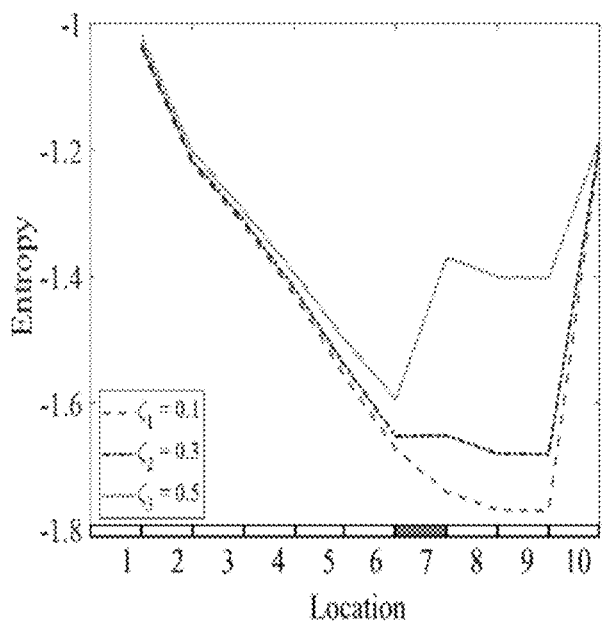
Figure 4A:
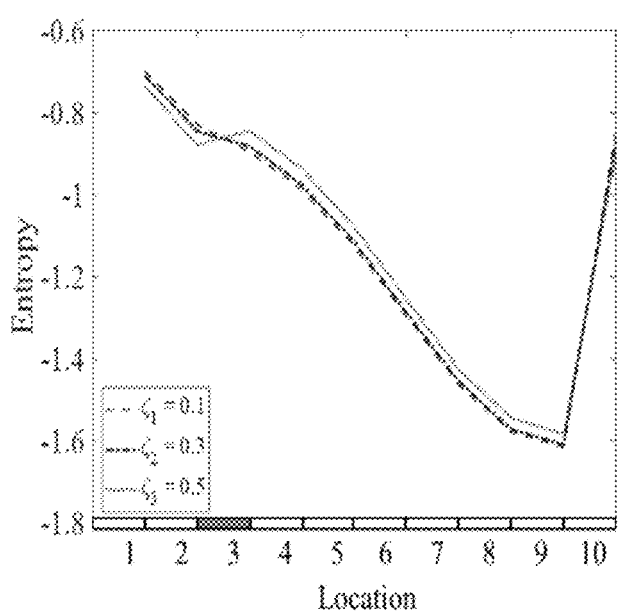
FIG. 4A-4C are the Shannon entropy curves at different positions in the case of fixed-simply supported single breathing crack in the invention.
Figure 4B:
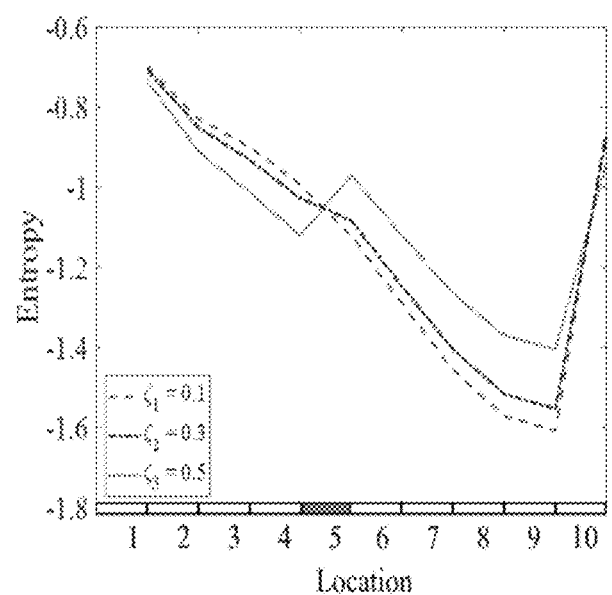
Figure 4C:
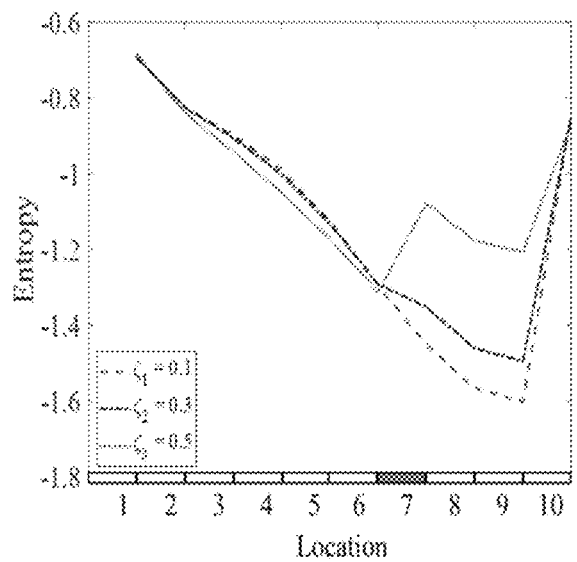
Figure 5A:
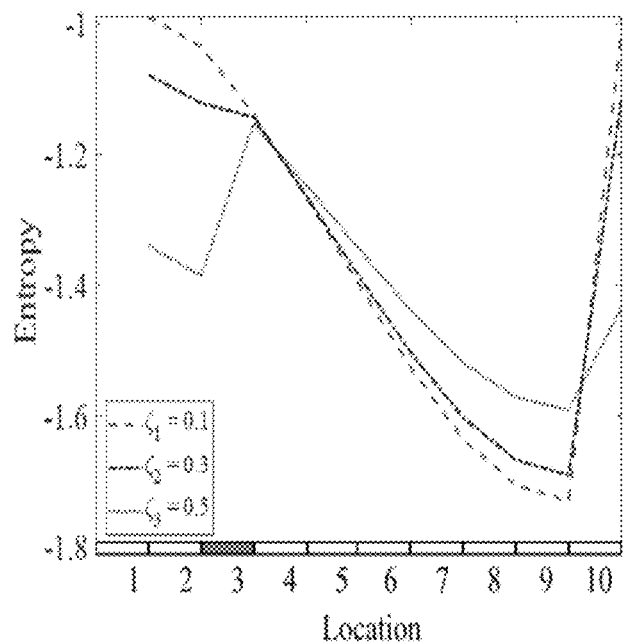
FIG. 5A-5C are the Shannon entropy curves at different positions in the case of simple support at both ends of a single breathing crack in the invention.
Figure 5B:
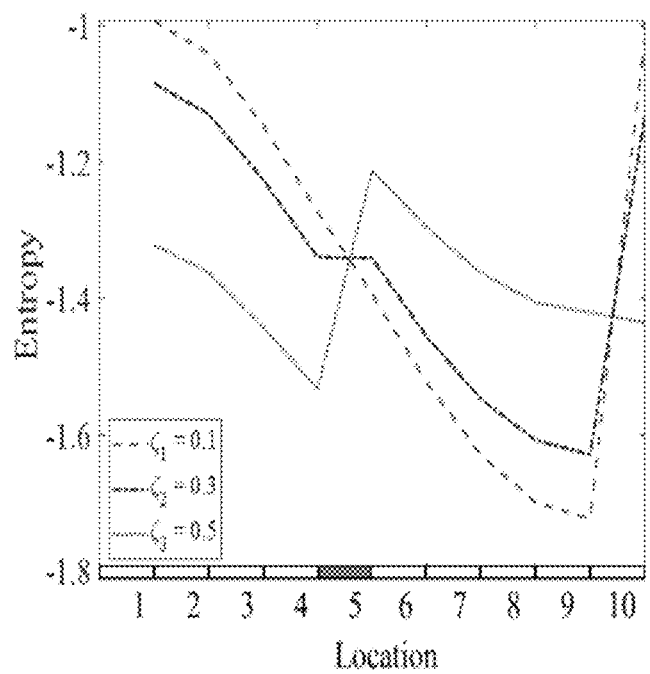
Figure 5C:
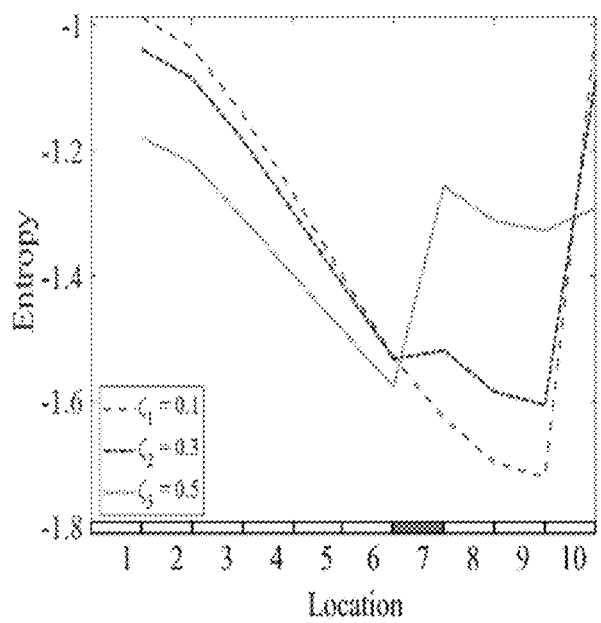
Figure 6A:
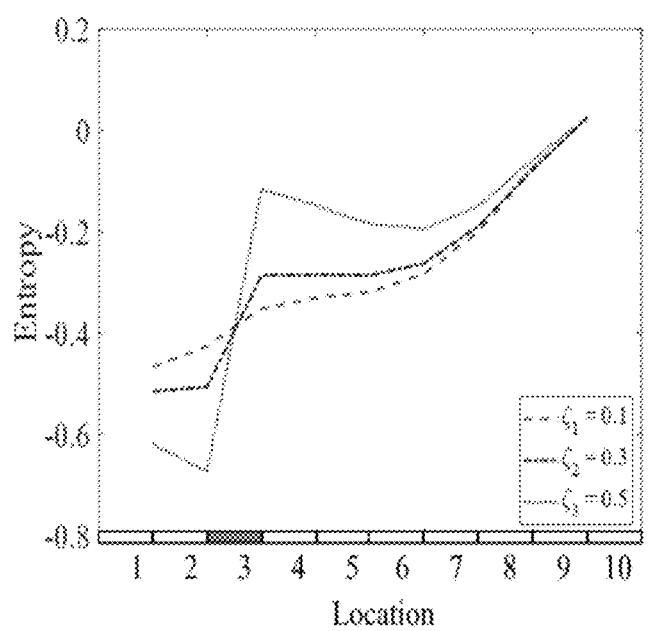
FIG. 6A-6C are the Shannon entropy curves at different positions in the case of fixed support at both ends of a single breathing crack in the invention.
Figure 6B:
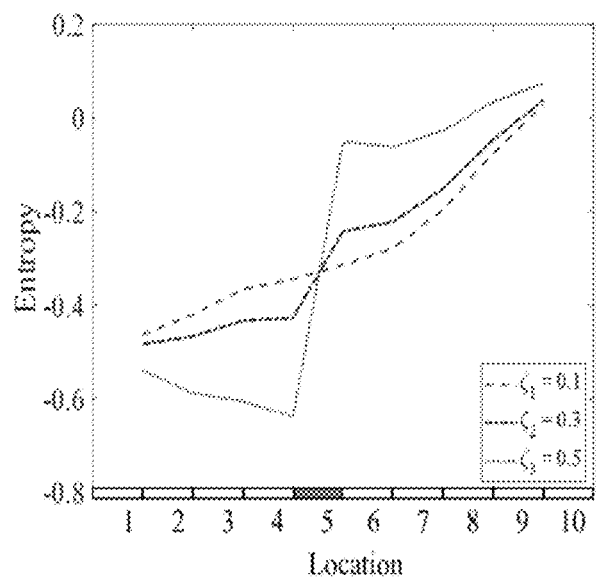
Figure 6C:
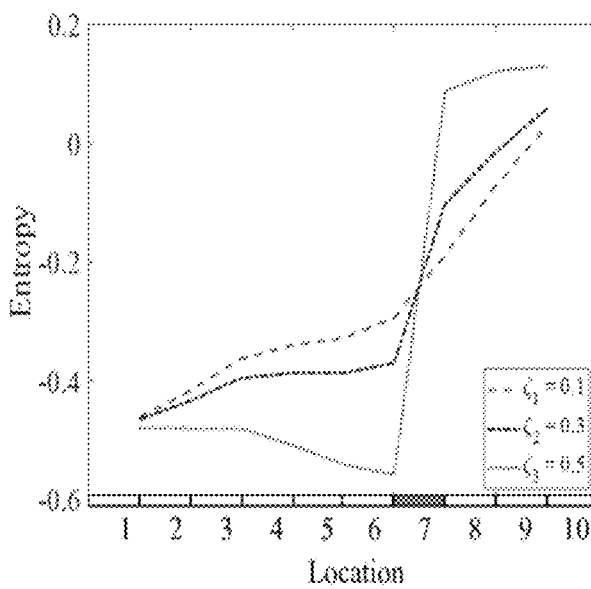
Figure 7A:
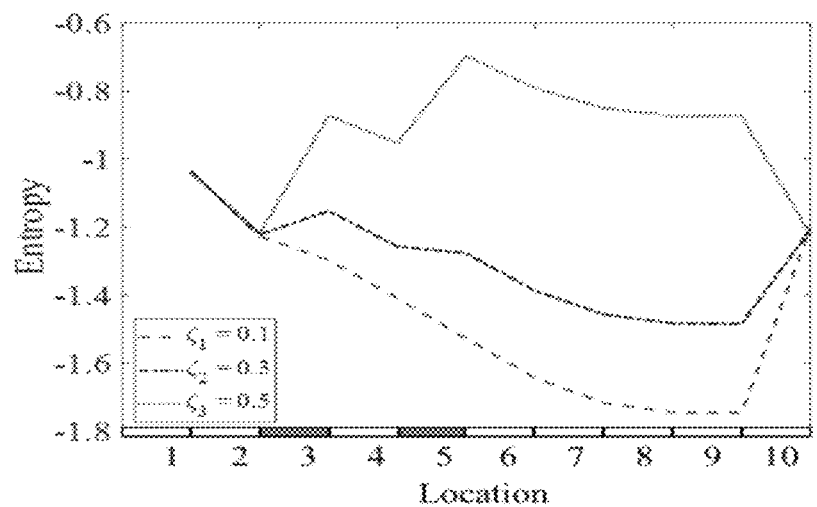
FIG. 7A-7C are the deviatoric Shannon entropy curves at different positions of several breathing cracks in the invention.
Figure 7B:
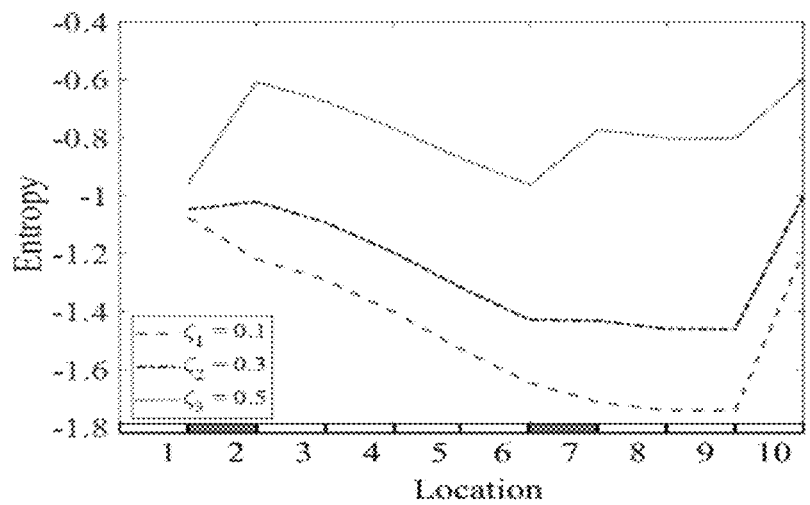
Figure 7C:
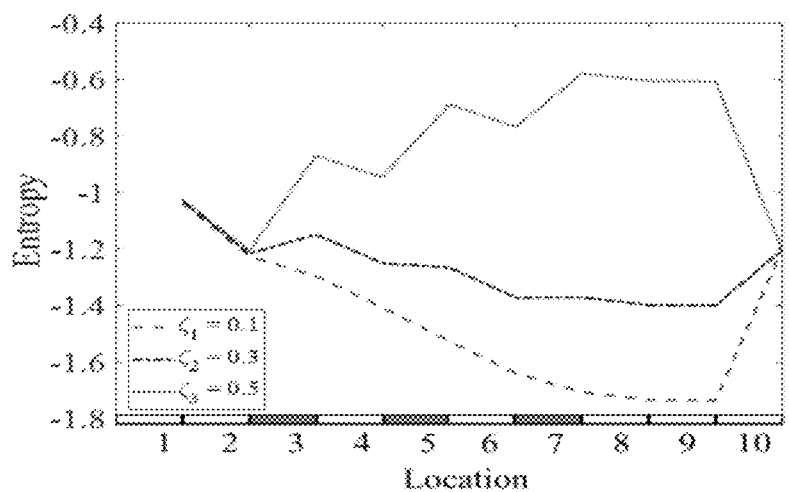
Figure 8A:
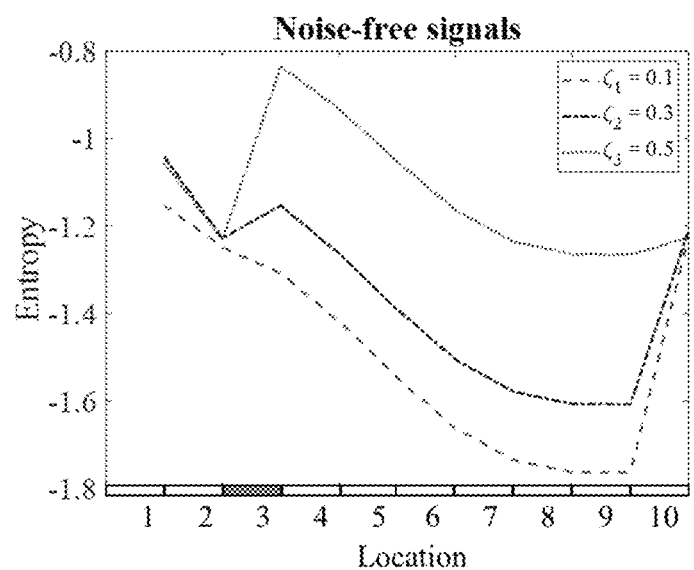
FIG. 8A-8F are the Shannon entropy curves under different noise conditions.
Figure 8B:
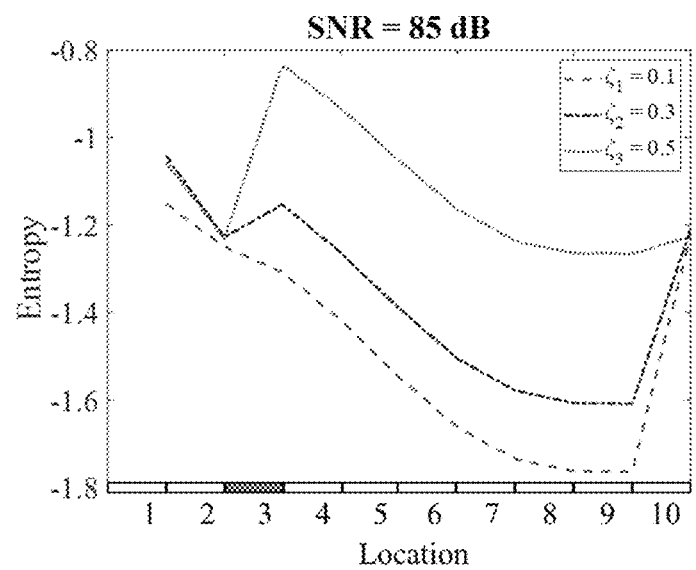
Figure 8C:
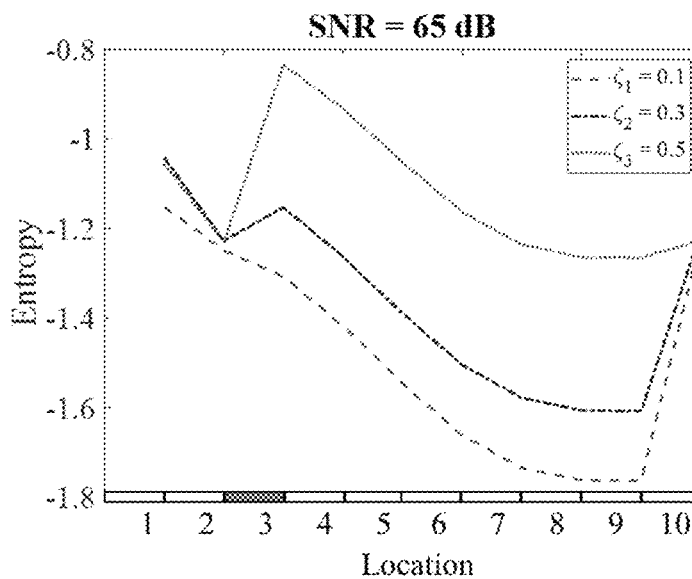
Figure 8D:
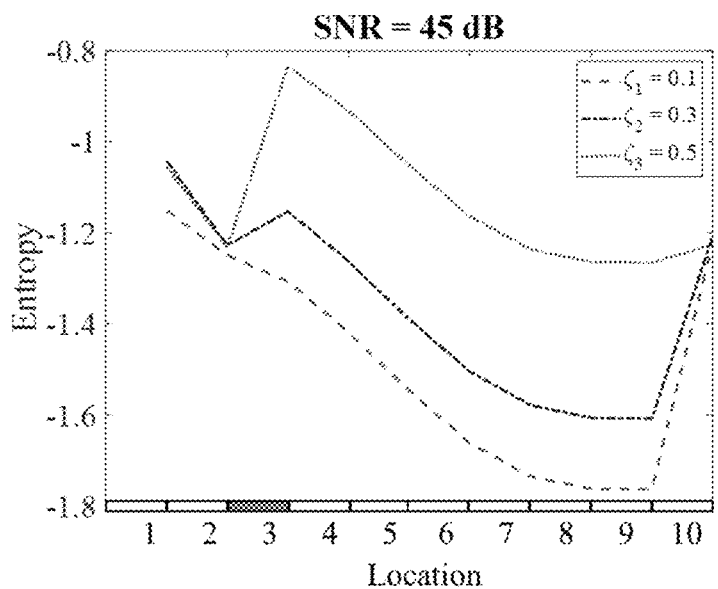
Figure 8E:
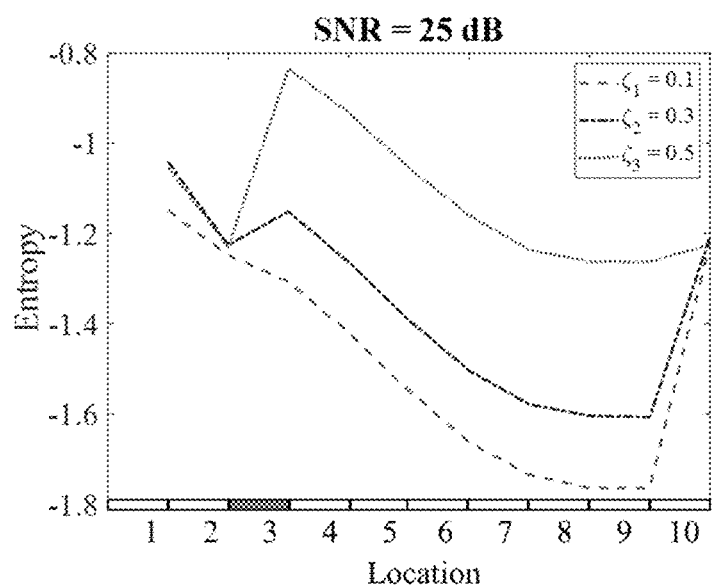
Figure 8F:
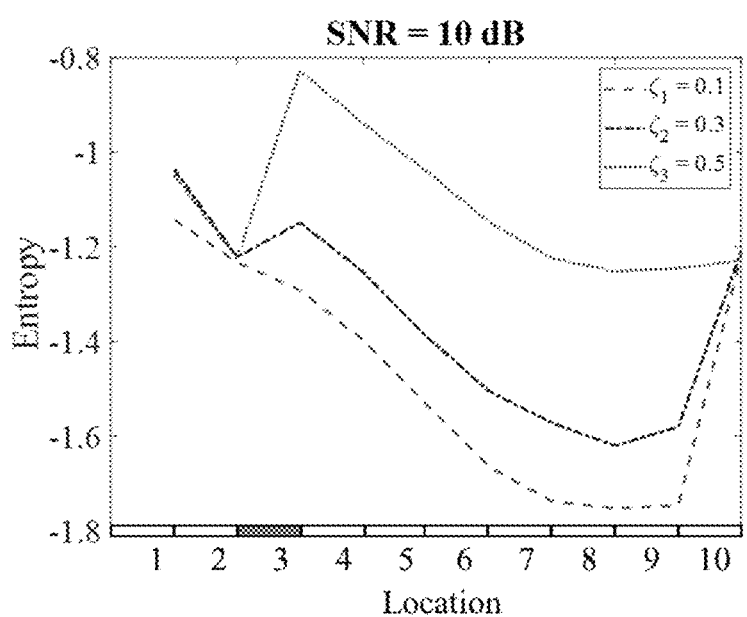

The embodiment is the method of single breathing and several fatigue cracks under different depths, positions, noise conditions, and boundary conditions that may occur in the beam structure. The nonlinear dynamic characteristics of beam structure are numerically simulated, including single and multiple breathing cracks. The high-order time-domain response statistical analysis method is used. The detailed calculation steps are as follows:

The cantilever beam is excited by Gaussian white noise at the fixed end, and the measurement points are also located at ten different positions on the surface of the beam to record the longitudinal displacement. As shown in FIG. 2, the position and depth of the breathing crack can be specified by dimensionless parameters. The position is $\zeta=x_c/l$, the depth is $\xi=a/c$, $x_c$ is the position of the monitoring point, l is the length of the beam, a is the crack depth, c is the height of the cross-section, and the working conditions are as follows:

Three different crack depths are considered, 3.5 mm ($\xi_1=0.1$), 10.5 mm ($\xi_2=0.3$), and 17.5 mm ($\xi_3=0.5$).

The noises in six conditions are considered, SNR=85, 65, 45, 25, 10.0 dB.

The crack identifications and locations under different boundary conditions in four cases of single breathing crack are considered (cantilever, fixed-simply supported, fixed at both ends, two simply supported);

Step 1, a sensor sequence composed of several sensors is arranged on the structure, which is used to apply excitation to the structure, collect the displacement time-history response curves at different positions on the structure, and establish a database of time-history data;

Step 2, according to the data set in the database, the information entropy of the time-history response at different positions on the acquisition structure is obtained based on the information entropy to measure the disorder degree of the time-domain response signal.

According to the location of several sensors, the information entropy values of the time-history response are connected in turn to obtain the time-history information entropy curve of the whole structure. See FIGS. 3-8.

Step 3, analyze of time-history information entropy curve; because the fatigue crack has 'repeated open and close' characteristics, the information entropy will highlight the amount of information when the fatigue crack opens, that is, the information entropy value will produce mutation, the information entropy curve will appear jump phenomenon, to determine the location of the crack. According to FIGS. 3-8:

The information entropy method is very sensitive to the breathing cracks at all studied positions. The sensitivity of the method to the crack position can be seen from the jumps on both sides of the crack, which indicates the location of the crack. In addition, a scattering point can be observed at the crack position, indicating the location of the crack. When the crack depth is significant, the jump is more obvious and decreases with the decrease of crack depth. At the same time, the influence of noise level on the performance of this method is also shown. The results show that the method has good robustness, which proves that the method can detect single and several breathing cracks under different noise conditions.

The invention discloses a boundary adaptive structural fatigue damage detection method driven by time-domain information entropy. The specific technical elements of the method include: the structure containing fatigue cracks and the information distribution of the displacement response will jump after fatigue crack modulation under excitation. The information entropy reflects the amount of fatigue crack information, and a sensor sequence consisting of several sensors is arranged along the structure. The statistical analysis of the multi-point information entropy collected by the sensor sequence forms an information entropy curve, and the information entropy jump reveals the position and degree of the fatigue cracks. Compared with traditional statistics, the information entropy makes the fatigue crack information independent, avoids the inability to effectively identify the occurrence, degree, and location of fatigue cracks due to changes in boundary conditions, and uses statistical attributes to characterize the damage, which provides the good noise robustness for this method. This method does not rely on numerical or physical models and provides a lightweight technology for monitoring (detecting) fatigue crack damage of actual structures using monitoring data.

Compared with the traditional method, which cannot identify the fatigue crack due to the change of the boundary conditions, the method of this invention overcomes the difficulty of the traditional method, which cannot extract the crack information in time effectively and has a worse anti-noise ability. The information on the fatigue crack is extracted from the time domain data, and the distribution curve of the time domain information entropy of the structure is obtained by the position of the sensor and the time-history displacement curve obtained by the sensor. According to the information entropy, the fatigue crack information is independent. Through the curve jump, the sensitivity analysis of the fatigue cracks at different depths and positions can be quickly judged in the area of several fatigue cracks, avoiding shortcomings that cannot be identified due to the change of boundary conditions. It also has good robustness and anti-noise ability.

The above disclosure is only an embodiment of the invention. However, the implementation examples of the invention are not limited to this. Any changes made by the technicians in this field shall fall into the protection scope of the invention.

What is claimed is:

1. A boundary adaptive structural fatigue damage detection method driven by time-domain information entropy, comprising the following steps:
    step 1, a sensor array composed of multiple sensors is arranged on a beam-based structure, an excitation following a JI distribution is applied to the beam-based structure, the JI distribution is selected from Gaussian distribution, chi-square distribution, and uniform distribution, displacement data from the sensor array is collected to establish a displacement database, each column in the displacement database represents a displacement time-domain response curve formed by the displacement data collected by the sensor array;
    step 2, the information entropy for each column in the displacement database is calculated using an information entropy formula, and entropy values at different locations on the beam-based structure are obtained;

$$H(X) = -\sum_{i=1}^{N} P(x_i) \log_2 [P(x_i)]$$

where $x_0, X_1, X_2, X_3, \ldots, X_{N-1}$ represent the displacement data, X represents the displacement time-domain response curve, N represents a length of X, H(X) represents the information entropy, $P(x_i)$ represents a proportion of a number of data points identical to the displacement data at time i relative to the length N;
    the information entropy is used to quantify uncertainty of a time-domain response signal, measure a degree of disorder in the time-domain response signal, higher entropy values are associated with greater signal disorder, while lower entropy values indicate more order, entropy values of time-domain responses from each sensor are sequentially connected based on their positions, resulting in an information entropy curve of the beam-based structure; and
    step 3, the time-domain information entropy curve is analyzed; instability of the time-domain response signal at a damage location increases, which leads to a rise of the entropy values and causes a sudden change in entropy at the damage location, a location of entropy jump is used to determine a corresponding sensor position, a region where a sensor with the entropy jump is located is checked to identify the damage.

* * * * *